(12) United States Patent
Zhong et al.

(10) Patent No.: US 11,931,828 B2
(45) Date of Patent: Mar. 19, 2024

(54) COPPER-PHOSPHORUS-TIN BRAZING WIRE AND PREPARATION METHOD THEREOF

(71) Applicant: ZHENGZHOU RESEARCH INSTITUTE OF MECHANICAL ENGINEERING CO., LTD., Henan (CN)

(72) Inventors: Sujuan Zhong, Henan (CN); Yongtao Jiu, Henan (CN); Yafang Cheng, Henan (CN); Junlan Huang, Henan (CN); Tianran Ding, Henan (CN); Guanxing Zhang, Henan (CN); Quanbin Lu, Henan (CN)

(73) Assignee: ZHENGZHOU RESEARCH INSTITUTE OF MECHANICAL ENGINEERING CO., LTD., Henan (CN)

( * ) Notice: Subject to any disclaimer, the term of this patent is extended or adjusted under 35 U.S.C. 154(b) by 0 days.

(21) Appl. No.: 18/169,192

(22) Filed: Feb. 14, 2023

(65) Prior Publication Data
US 2023/0405731 A1 Dec. 21, 2023

(30) Foreign Application Priority Data
Jun. 15, 2022 (CN) .......................... 202210677638.3

(51) Int. Cl.
*B23K 35/02* (2006.01)
*B23K 35/22* (2006.01)
(Continued)

(52) U.S. Cl.
CPC ...... *B23K 35/0227* (2013.01); *B23K 35/0261* (2013.01); *B23K 35/0272* (2013.01);
(Continued)

(58) Field of Classification Search
CPC .. B23K 35/0227; B23K 35/302; B23K 35/40; B23K 35/0261; B23K 35/0272;
(Continued)

(56) References Cited

U.S. PATENT DOCUMENTS 5,069,381 A 12/1991 Gibbs et al.

FOREIGN PATENT DOCUMENTS

| CN | 201897977 U | 7/2011 |
| CN | 104332211 A | 2/2015 |

(Continued)

OTHER PUBLICATIONS

Machine Translation, Cheng, et al., CN 106238947, Dec. 2016. (Year: 2016).*

(Continued)

*Primary Examiner* — Michael E. La Villa
(74) *Attorney, Agent, or Firm* — TAROLLI, SUNDHEIM, COVELL & TUMMINO L.L.P.

(57) ABSTRACT

The present disclosure provides a copper-phosphorus-tin brazing wire and a preparation method thereof, relates to the technical field of brazing materials. The copper-phosphorus-tin brazing wire is of a three-layer structure, the inner layer is Cu, the middle layer is Cu-14P alloy, and the outer layer is Sn, wherein the mass percentage of Sn is over 7%. The present disclosure solves the technical problems in the prior art that the copper-phosphorus-silver brazing filler metal is prone to produce defects such as pores and inclusions when brazing copper alloys, which leads to the decline of the mechanical properties of the joint, and simultaneously provides the preparation method of the copper-phosphorus-tin brazing wire, such that the technical problem that it is difficult to obtain copper-phosphorus-tin brazing wire with a wire diameter below 0.5 mm under the condition of high Sn content is solved.

10 Claims, 2 Drawing Sheets

(51) Int. Cl.
|  |  |
|---|---|
| *B23K 35/30* | (2006.01) |
| *B23K 35/365* | (2006.01) |
| *B23K 35/40* | (2006.01) |
| *B32B 1/08* | (2006.01) |
| *B32B 7/02* | (2019.01) |
| *B32B 15/01* | (2006.01) |
| *B32B 15/02* | (2006.01) |
| *B32B 15/04* | (2006.01) |
| *B32B 15/20* | (2006.01) |
| *C22C 9/00* | (2006.01) |
| *C22C 9/02* | (2006.01) |
| *C23C 2/08* | (2006.01) |
| *C23C 2/38* | (2006.01) |
| *C23C 28/00* | (2006.01) |
| *C23C 28/02* | (2006.01) |
| *C23C 30/00* | (2006.01) |

(52) U.S. Cl.
CPC ............ *B23K 35/22* (2013.01); *B23K 35/302* (2013.01); *B23K 35/365* (2013.01); *B23K 35/40* (2013.01); *B23K 35/404* (2013.01); *B23K 35/406* (2013.01); *B32B 1/08* (2013.01); *B32B 7/02* (2013.01); *B32B 15/01* (2013.01); *B32B 15/02* (2013.01); *B32B 15/04* (2013.01); *B32B 15/043* (2013.01); *B32B 15/20* (2013.01); *C22C 9/00* (2013.01); *C22C 9/02* (2013.01); *C23C 2/08* (2013.01); *C23C 2/38* (2013.01); *C23C 28/02* (2013.01); *C23C 28/021* (2013.01); *C23C 28/32* (2013.01); *C23C 28/321* (2013.01); *C23C 28/322* (2013.01); *C23C 30/00* (2013.01); *C23C 30/005* (2013.01); *Y10T 428/12708* (2015.01); *Y10T 428/12715* (2015.01); *Y10T 428/12882* (2015.01); *Y10T 428/12903* (2015.01); *Y10T 428/1291* (2015.01); *Y10T 428/24942* (2015.01); *Y10T 428/2495* (2015.01); *Y10T 428/26* (2015.01)

(58) Field of Classification Search
CPC .... B23K 35/22; B23K 35/365; B23K 35/404; B23K 35/406; B32B 1/08; B32B 7/02; B32B 15/01; B32B 15/02; B32B 15/04; B32B 15/043; B32B 15/20; C22C 9/00; C22C 9/02; C23C 2/08; C23C 2/38; C23C 28/02; C23C 28/021; C23C 28/032; C23C 28/321; C23C 28/322; C23C 30/00; C23C 30/005; Y10T 428/12708; Y10T 428/12715; Y10T 428/12882; Y10T 428/12903; Y10T 428/1291; Y10T 428/26; Y10T 428/2495; Y10T 428/24942
See application file for complete search history.

(56) References Cited

FOREIGN PATENT DOCUMENTS

| CN | 105390176 A |   | 3/2016 |   |
|---|---|---|---|---|
| CN | 106238947 A | * | 12/2016 | ......... B23K 35/0266 |
| JP | S58159999 A |   | 9/1983 |   |
| JP | S61106760 A |   | 5/1986 |   |
| WO | 2021/223781 A2 |   | 11/2021 |   |

OTHER PUBLICATIONS

Machine Translation, Suzuki, et al., JP 61-106760, May 1986. (Year: 1986).*
Applicant: Zhengzhou Machinery Research Institute Co., Ltd.; Chinese Application No. 202210677638.3; Filed Jun. 15, 2022; First Chinese Search Report dated Feb. 23, 2023. 3 pgs.
Applicant: Zhengzhou Machinery Research Institute Co., Ltd.; Chinese Application No. 202210677638.3; Filed Jun. 15, 2022; First Chinese Office Action dated Feb. 27, 2023; 4 pgs.
Applicant: Zhengzhou Machinery Research Institute Co., Ltd.; Chinese Application No. 202210677638.3; Filed Jun. 15, 2022; Supplementary Chinese Search Report dated May 19, 2023; 2 pgs.

* cited by examiner

COPPER-PHOSPHORUS-TIN BRAZING WIRE AND PREPARATION METHOD THEREOF

CROSS-REFERENCE TO RELATED APPLICATION

The present disclosure claims priority of Chinese patent application with the filing number 202210677638.3 filed on Jun. 15, 2022 with the Chinese Patent Office, and entitled "Copper-Phosphorus-Tin Brazing Wire and Preparation Method Thereof", the contents of which are incorporated herein by reference in entirety.

TECHNICAL FIELD

The present disclosure relates to the technical field of brazing materials, in particular to a copper-phosphorus-tin brazing wire and a preparation method thereof.

BACKGROUND ART

BCu89PAg and BCu91PAg are two kinds of copper-phosphorus-silver brazing filler metals which are heavily used currently in the air-conditioning and refrigeration industries to braze brass or red copper. As the price of silver increases, these two kinds of brazing filler metals consume larger amount of silver that is precious metal, which leads to a substantial increase in the cost of production of air conditioner, refrigeration, machinery, electrical appliances, valve and pipe fittings and other industries. In order to reduce cost, the development of environmentally friendly silver-free copper-phosphorus brazing filler metal is a research hotspot at home and abroad in the field of brazing.

At present, copper-phosphorus-tin brazing filler metal is the latest technological achievement for silver-free copper-phosphorus brazing filler metal. In order to save silver, adding Sn to the copper-phosphorus brazing filler metal can significantly reduce the melting temperature of the brazing filler metal. However, the copper-phosphorus brazing filler metal originally has more Cu3P brittle phases, with the increase of Sn content (more than 4%), the brazing filler metal will further form the CuSn brittle phase, which further deteriorates the processing performance of the brazing filler metal. It is difficult to obtain the copper-phosphorus-tin brazing wire whose wire diameter is below 0.5 mm by conventional preparation methods.

In addition, brazing copper alloy by existing copper-phosphorus-silver brazing filler metal is tend to form defects such as pores and inclusions, thereby leading to a decrease in mechanical properties of the joint.

In order to solve the aforementioned deficiencies, it is necessary to develop a copper-phosphorus-tin brazing wire for brazing copper and copper alloy with fewer defects and good brazing quality. At the same time, it is necessary to develop a preparation technology of copper-phosphorus-tin brazing wire to obtain a copper-phosphorus-tin brazing wire with smaller wire diameter.

In view of this, the present disclosure is specifically proposed.

SUMMARY

The purpose of the present disclosure is to provide a copper-phosphorus-tin brazing wire and a preparation method thereof, so as to solve the technical problems that defects such as pores and inclusions are easily generated when the copper-phosphorus-silver brazing filler metal existing in the prior art brazes copper alloys, resulting in a decrease in the mechanical properties of the joints. At the same time, it solves the technical problem that it is difficult to obtain a copper-phosphorus-tin brazing wire with a wire diameter below 0.5 mm in the case of a high Sn content.

The technical solution provided by the present disclosure is as follows.

In one aspect, the present disclosure provides a copper-phosphorus-tin brazing wire, the brazing wire is of a three-layer structure, wherein the inner layer is Cu, the middle layer is Cu-14P alloy, and the outer layer is Sn, and the mass percentage of Sn is above 7%.

The copper-phosphorus-tin brazing wire of the present disclosure has low melting temperature and good flow performance.

In one embodiment, the mass ratio of elements in the brazing wire is Cu:P:Sn=86:7:7. The mass percentage of P in the Cu-14P alloy is 14%.

It is found by the experiments of the present disclosure that the comprehensive performance of the brazing filler metal reaches the best, when the ratio of Cu:P:Sn is fixed to 86:7:7.

In one embodiment, the mass ratio of layers of the brazing wire is Cu:Cu14P:Sn=43:50:7.

In one embodiment, the wire diameter of the copper-phosphorus-tin brazing wire is less than or equal to 0.5 mm, preferably 0.1-0.5 mm.

The copper-phosphorus-tin brazing wire of the present disclosure has a relatively smaller wire diameter, which is 0.1-0.5 mm, and is suitable for brazing of copper and copper alloys.

In another aspect, the present disclosure provides a preparation method of copper-phosphorus-tin brazing wire, comprising the following steps:

(a) taking a Cu wire, and calculating the mass of Cu, Cu-14P alloy and Sn, and the required thickness of Cu-14P layer and Sn layer according to the mass of Cu wire and the mass ratio of Cu, P, Sn elements in the brazing wire;

(b) heating and smelting Cu-14P alloy into Cu-14P alloy liquid;

(c) heating and smelting Sn into Sn metal liquid;

(d) making the Cu wire of step (a) pass through the Cu-14P alloy liquid at the first speed, and then pass through the Sn metal liquid at the second speed; and (e) making the brazing wire coming out from the Sn metal liquid pass through the shaping die and wound up to obtain the copper-phosphorus-tin brazing wire.

In one embodiment, the ratio of the diameter of the Cu wire, the thickness of the Cu-14P alloy layer and the thickness of the Sn layer is fixed. In the present disclosure, for a Cu wire of a certain diameter, the quality of the Cu wire is calculated according to the diameter, length and density of the copper wire. According to the mass of Cu wire and the designed mass ratio of Cu, P, and Sn elements in the brazing wire (for example, Cu:P:Sn=86:7:7), the mass of Cu, Cu-14P alloy, Sn and the required thickness of Cu-14P layer and Sn layer are calculated.

In one embodiment, the mass ratio of Cu, Cu-14P alloy and Sn is 43:50:7. According to the mass of Cu wire used, the mass of Cu, Cu-14P alloy and Sn is calculated, then the required thickness of Cu-14P layer and Sn layer is calculated.

In one embodiment, an appropriate amount of Cu-14P alloy is placed inside the crucible, heated to certain temperature, and smelted into Cu-14P alloy liquid for later use.

An appropriate amount of Sn is placed in the crucible, heated to certain temperature, and smelted into Sn metal liquid for later use. The Cu wire is passed through the Cu-14P alloy liquid at a relatively low speed (the first speed), then passed through the Sn metal liquid at certain speed (the second speed), finally passed through the shaping die and then rolled up to obtain the copper-phosphorus-tin brazing wire.

In one embodiment, the Cu-14P alloy is heated and smelted into Cu-14P alloy liquid, and in this step (b), the Cu-14P alloy is heated to a temperature of 900° C. to 980° C., including 920° C. to 960° C., such as but not limited to 900° C., 920° C., 930° C., 940° C., 950° C., 960° C. and 980° C.

In one embodiment, the Sn is heated and smelted into Sn metal liquid, and in this step, the Sn is heated to a temperature of 220° C. to 250° C., such as but not limited to 220° C., 225° C., 230° C., 235° C., 240° C., 245° C. and 250° C.

In one embodiment, the speed of passing through the Cu-14P alloy liquid is less than the speed of passing through the Sn metal liquid. Specifically, the first speed is 10-20 mm/s, and the second speed is 20-30 mm/s.

In one embodiment, the shaping die is made of YG8.

In another aspect, the present disclosure also provides use of the copper-phosphorus-tin brazing wire in brazing of copper and copper alloy, such as use in brazing of brass-red copper dispenser.

Beneficial Effects

In the present disclosure, by using the high plasticity of red copper, based on the self-brazing and wetting properties of Cu14P to red copper and the infiltration property between Cu14P alloy and Sn liquid, these three are alloyed into one, such that the copper-phosphorus-tin brazing wire with a wire diameter below 0.5 mm is formed, wherein the melting temperature of the copper-phosphorus-tin brazing wire of the present disclosure is lower (which can reach 645-660° C.), and the flow performance thereof is better.

When the copper-phosphor-tin brazing wire of the present disclosure is used for brazing of copper and copper alloy, there are fewer defects in the brazing seam, and the brazing quality is stable.

In the present disclosure, copper-phosphorus-tin brazing wire with higher Sn content and wire diameter below 0.5 mm is prepared, which overcomes the technical limitation of the traditional preparation method.

BRIEF DESCRIPTION OF DRAWINGS

In order to illustrate the technical solutions in the specific embodiments of the present disclosure or the prior art more clearly, the following briefly introduces the drawings that need to be used in the description of the specific embodiments or the prior art. Obviously, the drawings in the following description are some embodiments of the present disclosure. For those skilled in the art, other drawings can also be obtained based on these drawings without creative efforts.

DETAILED DESCRIPTION OF EMBODIMENTS

The technical solutions of the present disclosure will be clearly and completely described below with reference to the embodiments. Obviously, the described embodiments are part of the embodiments of the present disclosure, rather than all the embodiments. Based on the embodiments of the present disclosure, all other embodiments obtained by those of ordinary skill in the art without creative efforts shall fall within the protection scope of the present disclosure.

Example 1

A copper-phosphorus-tin brazing wire is composed of a three-layer structure, the inner layer is Cu, the middle layer is Cu-14P alloy, and the outer layer is Sn.

The mass ratio of each element in the mentioned brazing wire is Cu:P:Sn=86:7:7.

The mass ratio of each layer in the mentioned brazing wire is Cu:Cu14P:Sn=43:50:7.

The above-mentioned preparation method of copper-phosphorus-tin brazing wire comprises the following steps:

Step (1): taking 4.3 kg of Cu wire with diameter of 0.05 mm, calculating the mass of Cu-14P and Sn respectively according to the mass of the copper wire and the mass ratio of the three; calculating, according to the density, the thickness of the Cu-14P layer required by the Cu wire, which is 0.0475 mm, and the thickness of the Sn layer, which is 0.0025 mm, wherein the ratio of the diameter of the Cu wire, the thickness of the Cu-14P layer, and the thickness of the Sn layer in step (1) is constant;

Step (2): putting an appropriate amount of Cu-14P alloy inside the crucible, heating the Cu-14P alloy to a certain temperature (980° C.), so as to smelt the Cu-14P alloy into Cu-14P alloy liquid for later use;

Step (3): putting an appropriate amount of Sn inside the crucible, heating the Sn to a certain temperature (250° C.), so as to smelt the Sn into Sn metal liquid for later use;

Step (4): making the Cu wire of step (1) pass through the Cu-14P alloy liquid at a lower speed (20 mm/s), and then pass through the Sn metal liquid at a higher speed (30 mm/s); and Step (5): making the brazing wire coming out from the Sn liquid pass through the YG8 shaping die and wound up to obtain a 10 Kg copper-phosphorus-tin brazing wire with a diameter about 0.1 mm.

Figure 1:
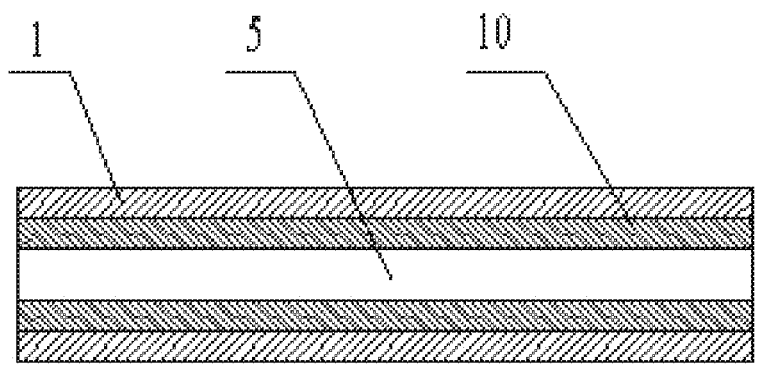
FIG. 1 is the schematic structural diagram of the present disclosure.

FIG. 1 is a schematic diagram of the structure of the brazing wire of the present disclosure, wherein 1 is the Sn layer, 10 is the Cu-14P layer, and is the Cu layer.

Figure 2:
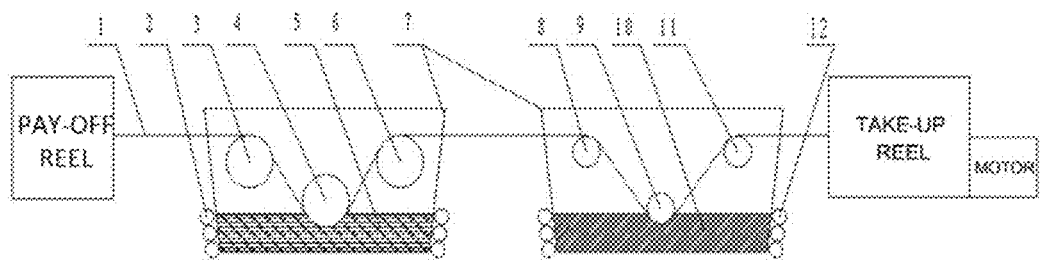
FIG. 2 is a flow chart of the preparation process of the present disclosure (reference signs in the figure: 1, red copper wire; 2, induction coil 1; 3, guide wheel 1; 4, guide wheel 2; 5, Cu14P liquid; 6, guide wheel 3; 7, graphite crucible; 8, guide wheel 4; 9, guide wheel 5; 10, Sn liquid; 11, guide wheel 6; 12, induction coil 2)

FIG. 2 is a flow chart of the preparation process of the present disclosure, wherein the reference signs in the figure indicate: 1, red copper wire; 2, induction coil 1; 3, guide wheel 1; 4, guide wheel 2; 5, Cu14P liquid; 6, guide wheel 3; 7, graphite crucible; 8, guide wheel 4; 9, guide wheel 5; 10, Sn liquid; 11, guide wheel 6; 12, induction coil 2. In the preparation method of the present disclosure, the Cu wire passes through the Cu-14P alloy liquid (i.e., Cu14P liquid) at a lower speed, and then passes through the Sn metal liquid (i.e., Sn liquid) at a higher speed, and the brazing wire coming out of the Sn liquid goes through the YG8 shaping die, then is rolled up to obtain the copper-phosphorus-tin brazing wire.

Example 2

The composition, structure and preparation method of the brazing filler metal of the present disclosure are all identical to those in Example 1.

Being different from Example 1, the diameter of the Cu wire in step (1) is 0.1 mm, the thickness of the Cu-14P layer is 0.095 mm, and the thickness of the Sn layer is 0.005 mm.

The certain temperature described in step (2) is 960° C., and the certain temperature described in step (3) is 240° C.

The lower speed described in step (4) is 16 mm/s and the higher speed is 28 mm/s.

The diameter of the mentioned brazing wire in step (5) is about mm.

Example 3

The composition, structure and preparation method of the brazing filler metal of the present disclosure are all identical to those in Example 1.

Being different from Example 1, the diameter of the Cu wire in step (1) is 0.15 mm, the thickness of the Cu-14P layer is 0.1425 mm, and the thickness of the Sn layer is 0.0075 mm.

The certain temperature described in step (2) is 940° C., and the certain temperature described in step (3) is 230° C.

The lower speed described in step (4) is 14 mm/s and the higher speed is 26 mm/s.

The diameter of the brazing wire in step (5) is about 0.3 mm.

Example 4

The composition, structure and preparation method of the brazing filler metal of the present disclosure are all identical to those in Example 1.

Being different from Example 1, the diameter of the Cu wire in step (1) is 0.2 mm, the thickness of the Cu-14P layer is 0.19 mm, and the thickness of the Sn layer is 0.01 mm.

The certain temperature described in step (2) is 920° C., and the certain temperature described in step (3) is 235° C.

The lower speed described in step (4) is 12 mm/s, and the higher speed is 22 mm/s.

The diameter of the brazing wire in step (5) is about 0.4 mm.

Example 5

The composition, structure and preparation method of the brazing filler metal of the present disclosure are all identical to those in Example 1.

Being different from Example 1, the diameter of the Cu wire in step (1) is 0.25 mm, the thickness of the Cu-14P layer is 0.2375 mm, and the thickness of the Sn layer is 0.0125 mm.

The certain temperature described in step (2) is 900° C., and the certain temperature described in step (3) is 220° C.

The lower speed described in step (4) is 10 mm/s, and the higher speed is 20 mm/s.

The diameter of the brazing wire in step (5) is about 0.5 mm.

Comparative Example 1

In order to investigate the brazing process performance of the copper-phosphorus-tin brazing wire of the present disclosure and the traditional copper-phosphorus-silver brazing filler metal, the brazing wire in the embodiments and traditional BCu89PAg and BCu91PAg are tested by the DTA thermal analysis method to get their melting temperature, the test results are shown in the following table. According to the method of GB/T11364, the brazing filler metal in Example 1 and the traditional brazing filler metal are subjected to the spreading and wetting test, and their spreading morphology are compared.

TABLE 1

Test results of the brazing filler metal melting temperature

|  | Solidus temperature/° C. | Liquidus temperature/° C. |
| --- | --- | --- |
| Example 1 | 645 | 660 |
| Example 2 | 643.2 | 658.5 |
| Example 3 | 640 | 653 |
| Example 4 | 644.5 | 650 |
| Example 5 | 640.8 | 647 |
| BCu89PAg | 650 | 800 |
| BCu91PAg | 645 | 810 |

From Table 1, it can be seen that compared with the traditional copper-phosphorus-silver brazing filler metal, the melting temperature of each brazing filler metal in the examples, especially the liquidus temperature, is reduced to below 660° C. by about 150° C.

Figure 3:
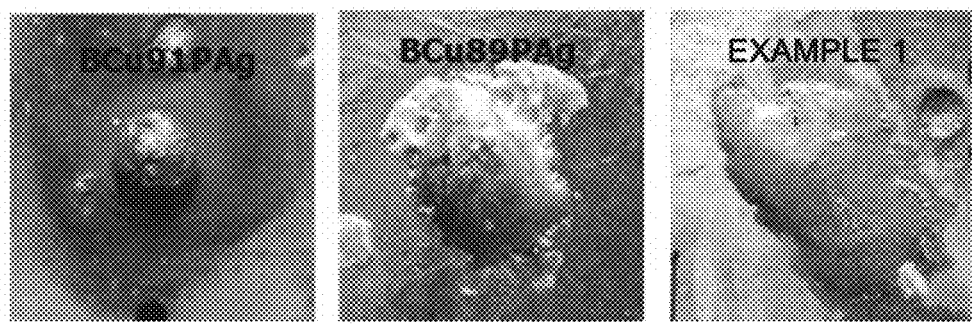
FIG. 3 is the comparative spreading morphology of the spreading and wetting test of the brazing filler metal in Example 1 of the present disclosure and a conventional brazing filler metal.

FIG. 3 shows the spreading morphologies of different brazing filler metals on brass (750° C.). From the comparison of the spreading morphologies in FIG. 3, it can be seen that under the same test temperature (750° C.), the melting temperature of the brazing filler metal of Example 1 is lower and the spreading area is larger, while the melting temperature of the traditional brazing filler metal is higher, and only part of brazing filler metal melts at such temperature, such that the spreading area is smaller.

The brazing process performance of other examples is similar to that of Example 1, and the results are not all shown.

Comparative Example 2

In order to investigate the brazing effect of the brazing filler metal of the embodiments and the traditional copper-phosphorus brazing filler metal, the brazing filler metal of Example 1 and the traditional copper-phosphorus-silver brazing filler metal are tested by brazing brass-red copper dispenser, respectively, and sawing the resultant after brazing, to observe the filling (jointing) condition of the brazing seam and estimate the brazed rate of the brazing seam (on the slicing surface, the effective filling length/nominal filling length).

Figure 4:
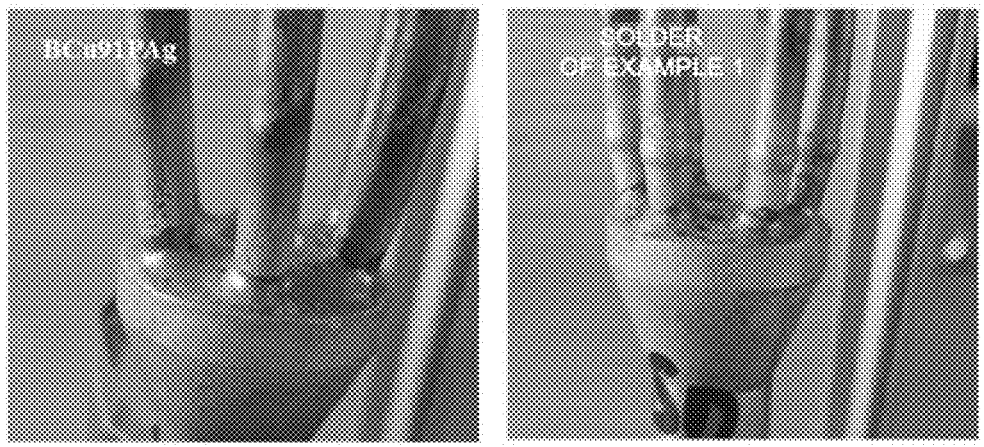
FIG. 4 is the macroscopic morphology of the brazed joint of BCu91PAg and the brazing filler metal of Example 1.
Figure 5:
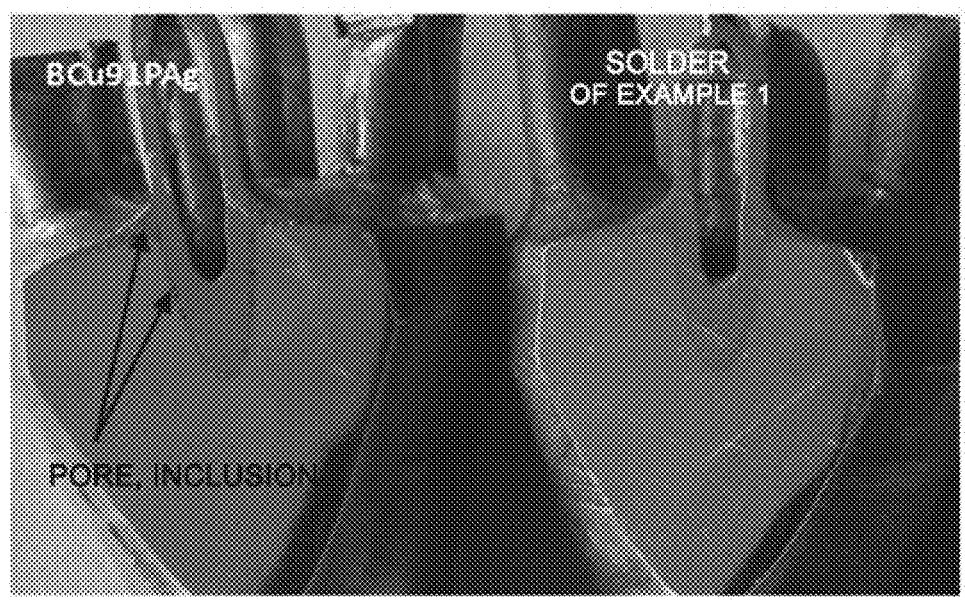
FIG. 5 is the slicing morphology of the brazing seam of BCu91PAg and the brazing filler metal of Example 1.

FIG. 4 shows the macroscopic morphology of BCu91PAg and the brazing filler metal of Example 1; and FIG. 5 shows the slicing morphology of the brazing seam of BCu91PAg and the brazing filler metal of Example 1. Table 2 shows the condition of filling the brazing seam by different brazing filler metals.

TABLE 2

Filling Condition of Different Brazing Filler Metals

| | Brazed rate/% | Pores and inclusions |
|---|---|---|
| Example 1 | 89% | No pore, a few inclusions |
| Example 2 | 90% | No pore, a few inclusions |
| Example 3 | 88% | A few pores, a few inclusions |
| Example 4 | 90% | No pore, a few inclusions |
| Example 5 | 92% | No pore, a few inclusions |
| BCu89PAg | 82% | Lots of pores and inclusions |
| BCu91PAg | 80% | Lots of pores and inclusions |

From FIG. 5 and Table 2, it can be seen that there are more defects such as pores and inclusions in the brazing seam of the traditional copper-phosphor-silver brazing filler metal. The brazing seam of the brazing filler metal of the embodiments has fewer defects and the overall brazing quality is better. The brazed rate is above 89%.

Finally, it should be noted that the aforementioned embodiments are only to illustrate, not to limit the technical solutions of the present invention. Although the present disclosure has been described in detail with reference to the foregoing embodiments, those of ordinary skill in the art should understand that the technical solutions described in the foregoing embodiments can still be modified, or some or all of the technical features thereof can be equivalently replaced. However, these modifications or substitutions do not make the essence of the corresponding technical solutions deviate from the scope of the technical solutions of the embodiments of the present disclosure.

What is claimed is:

1. A copper-phosphorus-tin brazing wire, wherein the brazing wire is of a three-layer structure, wherein an inner layer is Cu, a middle layer is a Cu-14P alloy and a mass percentage of P in the Cu-14P alloy is 14%, and an outer layer is Sn in the brazing wire and a mass percentage of Sn is above 7%.

2. The copper-phosphorus-tin brazing wire according to claim 1, wherein a mass ratio of elements in the brazing wire is Cu:P:Sn=86:7:7.

3. The copper-phosphorus-tin brazing wire according to claim 1, wherein a mass ratio of layers in the brazing wire is Cu:Cu14P:Sn=43:50:7.

4. The copper-phosphorus-tin brazing wire according to claim 1, wherein a wire diameter of the brazing wire is 0.1 to 0.5 mm.

5. A preparation method of the copper-phosphorus-tin brazing wire according to claim 1, comprising following steps:
   (a) taking a Cu wire, and calculating a mass of Cu, the Cu-14P alloy and Sn, and a required thickness of a Cu-14P layer and an Sn layer according to a mass of the Cu wire and a mass ratio of Cu, P, and Sn elements in the brazing wire;
   (b) heating and smelting the Cu-14P alloy into a Cu-14P alloy liquid;
   (c) heating and smelting Sn into a Sn metal liquid;
   (d) making the Cu wire of the step (a) pass through the Cu-14P alloy liquid at a first speed, and then pass through the Sn metal liquid at a second speed; and
   (e) making the brazing wire coming out from the Sn metal liquid pass through a shaping die and wound up to obtain the copper-phosphorus-tin brazing wire.

6. The preparation method according to claim 5, wherein a ratio of a diameter of the Cu wire, a thickness of the Cu-14P alloy layer and a thickness of the Sn layer is fixed.

7. The preparation method according to claim 5, wherein in the step (b), the Cu-14P alloy is heated to a temperature of 900-980° C.

8. The preparation method according to claim 5, wherein in the step (c), Sn is heated to a temperature of 220-250° C.

9. The preparation method according to claim 5, wherein the first speed is 10-20 mm/s, and the second speed is 20-30 mm/s.

10. The preparation method according to claim 5, wherein a material of the shaping die is YG8.

* * * * *